United States Patent [19]

Miwa et al.

[11] 4,405,774

[45] Sep. 20, 1983

[54] ETHYLENE COPOLYMER

[75] Inventors: Yukimasa Miwa, Nagoya; Takeo Shimada, Yokkaichi; Shigekazu Hayashi, Yokkaichi; Michito Ukita, Yokkaichi; Hideaki Nakagawa, Suzuka; Mitsuyuki Matsuura, Kameyama, all of Japan

[73] Assignee: Mitsubishi Petrochemical Company Limited, Tokyo, Japan

[21] Appl. No.: 331,966

[22] Filed: Dec. 18, 1981

[30] Foreign Application Priority Data

Dec. 23, 1980 [JP] Japan ............................. 55-181346

[51] Int. Cl.$^3$ ........................................... C08F 210/16
[52] U.S. Cl. ............................. 526/348.2; 252/429 C; 526/119; 526/124; 526/125; 526/348.3; 526/348.4; 526/348.5; 526/348.6
[58] Field of Search ............... 526/348.2, 348.3, 348.4, 526/348.5, 348.6

[56] References Cited

U.S. PATENT DOCUMENTS

| 3,645,992 | 2/1972 | Elston | 526/348.6 |
| 3,920,621 | 11/1975 | Baxmann et al. | 526/348.6 |
| 4,243,619 | 1/1981 | Fraser et al. | 526/348.6 |
| 4,302,565 | 11/1981 | Goeke et al. | 526/348.6 |
| 4,330,651 | 5/1982 | Sakurai et al. | 526/348.6 |

FOREIGN PATENT DOCUMENTS

| 4651 | 10/1979 | European Pat. Off. | 526/348.6 |
| 1355245 | 6/1974 | United Kingdom | 526/124 |

Primary Examiner—Edward J. Smith
Attorney, Agent, or Firm—Robert E. Burns; Emmanuel J. Lobato; Bruce L. Adams

[57] ABSTRACT

A copolymer of ethylene and a minor proportion of an α-olefin having 4 to 10 carbon atoms is characterized by having the properties (1) a melt flow rate (MFR) of 0.1 to 100 g/10 min.;
(2) a density of 0.91 to 0.94 g/cm$^3$; and
(3) a xylene absorption per unit amorphous region (Y) satisfying the formula:

$$Y < -0.80X + 0.67$$

wherein X is the degree of the crystallinity of the copolymer. By satisfying the above requirements, the copolymer can give a film packaging material having excellent transparency, impact strength and opening property (anti-blocking property) in combination.

10 Claims, 1 Drawing Figure

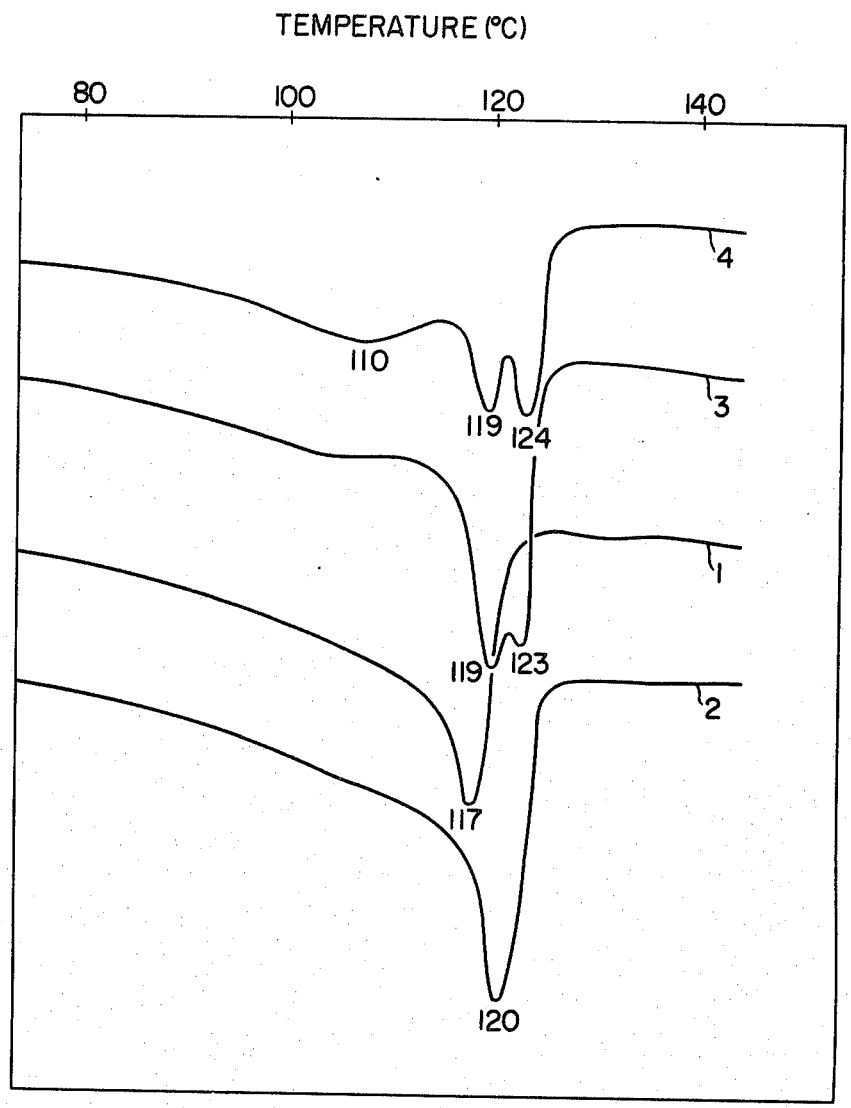

4,405,774

ETHYLENE COPOLYMER

BACKGROUND OF THE INVENTION

The present invention relates to an ethylene copolymer exhibiting excellent transparency, impact resistance and opening property when it is formed into a bag (hereinafter merely referred to as opening property).

High-pressure polyethylene is known as a resin having a relatively high transparency. In order to make the best use of its transparency, high-pressure polyethylene is used as a material for films, hollow containers and the like. However, as far as the film application is concerned, a thin film made of high-pressure polyethylene is useless for practical purposes because it exhibits low tear strength and impact strength. Therefore, high-pressure polyethylene is limited in its film application.

On the other hand, it is known that a copolymer of ethylene with an α-olefin having 3 or more carbon atoms, which is prepared by copolymerizing the ethylene with the α-olefin in the presence of a Ziegler catalyst or a Phillips catalyst under a low pressure, is a resin having an excellent mechanical strength and almost the same density as that of the high-pressure polyethylene. Ordinarily, in the production of the copolymer, titanium type catalysts are used as the Ziegler catalyst, or chromium type catalysts are used as the Phillips catalyst, and a pressure of 100 kg/cm$^2$ or less is used. The copolymers resulting from these processes are disadvantageous in that they exhibit poor transparency and opening property.

In this connection, there has been proposed a process for improving the transparency of the copolymers as disclosed in Japanese Patent Application Laid-open No.53-92887. However, as far as we know, the copolymer obtained by such a process is still unsatisfactory in its opening property.

The opening property is one of important qualities for a packaging film. If a bag has a poor opening property, it is impossible to pack efficiently an article thereinto. With regard to polymeric films, the index of blocking is used to indicate the adhesion of the polymeric films to each other. The index "opening property" as used herein signifies nothing but blocking when the polymeric films are in a specific form of product, i.e., bags.

SUMMARY OF THE INVENTION

Under these circumstances, we concentrated our efforts on the development of an ethylene copolymer which is excellent in respect to all of transparency, impact resistance, and opening property. As a result of this, we have found that such a copolymer can be produced and that such a copolymer is a special polymer product which has never been produced to date. More specifically, we have found that when the percentage of xylene absorption of the ethylene copolymer is reduced to less than that of a conventional polyethylene, the above mentioned object can be attained.

Accordingly, the copolymer of ethylene and a minor proportion of an α-olefin having 4 to 10 carbon atoms according to the present invention is characterized by having in combination the following properties:

(1) Melt Flow Rate (MFR): 0.1 to 100 g/10 min.,
(2) Density: 0.91 to 0.94 g/cm$^3$, and
(3) A xylene absorption per unit amorphous region (Y) satisfying the following formula.

$$Y < -0.80X + 0.67$$

wherein X is the degree of the crystallinity of the copolymer.

The copolymer of the present invention can be said to be more advanced than conventional ethylene polymers in that it is improved in both transparency and opening property. In addition, the copolymer of the present invention has far greater impact resistance than the conventional copolymers prepared by using Ziegler catalysts under low pressure.

BRIEF DESCRIPTION OF THE DRAWING

In the drawing, the single FIGURE is a reproduction of a graph showing heat absorption curves of the copolymers of Examples 1 and 2 and Comparative Examples 4 and 5 which were obtained by the differential thermal analysis (DSC).

DETAILED DESCRIPTION OF THE INVENTION

1. Copolymer

The ethylene copolymer of the present invention is defined by a number of physical properties.

(1) Composition

The copolymer is a copolymer of ethylene and a minor proportion of an α-olefin having 4 to 10 carbon atoms.

The term "minor proportion" as used herein refers to about 0.5 to 8 mole%, preferably, about 1 to 5 mole%, of the α-olefin, based on the total of the α-olefin units and the ethylene units.

An actual product represented by the term "polyethylene" is mostly a copolymer containing a small amount of modifying monomer units. Therefore, the term "copolymer of ethylene and a minor proportion of an α-olefin having 4 to 10 carbon atoms" as used herein is intended to include copolymers comprising, in addition to these two monomer units, a minor proportion, e.g., up to 10 mole%, preferably, up to 4.0 mole%, based on the total of the ethylene monomer units and the α-olefin units, of copolymerizable monomers such as propylene. Because the polymer of the present invention contains a significant amount of the comonomer (α-olefin) units, it is referred to as copolymer throughout the specification. However, the copolymer of the present invention may also be called polyethylene according to the above mentioned practice.

The α-olefins having 4 to 10 carbon atoms which are usable for the present invention are selected from those having a linear or branched chain. Examples of such α-olefins are 1-butene, 1-pentene, 1-hexene, 4-methyl-1-pentene, 1-octene, 1-decene and mixtures thereof. α-olefins having 4 to 8 carbon atoms, particularly, 6 to 8 carbon atoms, are preferable.

(2) Density

The copolymer according to the present invention has a density of from 0.91 to 0.94 g/cm$^3$. The density is determined according to ASTMD-1505.

The upper limit of the density is determined so as to provide excellent transparency of the copolymer. The preferable upper limit is about 0.93 g/cm$^3$.

On the other hand, the lower limit of the density is determined so as to provide the excellent opening property of the copolymer. The preferable lower limit is about 0.915 g/cm³.

The density of the copolymer is somewhat variable depending on the composition of the copolymer. However, as long as the α-olefin unit content in the copolymer is within the above stated range, the density of the copolymer falls within the above mentioned range.

(3) Melt Flow Rate (MFR)

The MFR of the copolymer of the present invention is in the range of from 0.1 to 100 g/10 min. The MFR is determined according to ASTMD-1238.

The upper limit of the MFR is determined so as to provide the excellent mechanical properties of the copolymer. The preferable upper limit is 10 g/10 min.

On the other hand, the lower limit of the MFR is determined so as to provide the excellent moldability of the copolymer. The preferable lower limit is 0.5 g/10 min.

(4) Xylene absorption

The xylene absorption per unit amorphous region (Y) is the most important factor distinguishing the copolymer of the present invention from other similar polymers. In accordance with the present invention, the xylene absorption per unit amorphous region (Y) should satisfy the following expression in relation to the degree of crystallinity (X) of the copolymer:

$$Y < -0.80X + 0.67$$

Preferably, this relationship is represented by the following formula:

$$Y \leq -0.92X + 0.70$$

With regard to conventional polyethylenes, the above stated relationship is represented by the following formula:

$$Y \geq -0.80X + 0.67$$

In this regard, the xylene absorption per unit amorphous region (Y) and the degree of crystallinity (X) are determined according to the following methods.

(1) Xylene absorption per unit amorphous region (Y)

A test piece consisting of a press sheet having a thickness of 1 mm and a weight of $W_1$ is immersed in a temperature-controlled bath filled with xylene at a temperature of 23° C. for 24 hours. After the immersion, the weight $W_2$ of the test piece is determined. The xylene absorption (S) is determined as the weight gain of the test piece calculated by the equation:

$$S = \frac{W_2 - W_1}{W_1}$$

In terms of the degree of crystallinity X of the test piece, the xylene absorption per unit amorphous region (Y) of the test piece is represented by the following equation:

$$Y = S/(1-X)$$

(2) Degree of crystallinity (X)

The degree of crystallinity (X) is determined from the density according to the following equation:

$$D = \rho_c X + \rho_a (1-X)$$

wherein:
D is the density of the specimen,
$\rho_c$ is the density of the crystal region of the polyethylene: 1.014 g/cm³
$\rho_a$ is the density of the amorphous region of the polyethylene: 0.850 g/cm³

Examinations by us indicated that there is a significant correlation between the rate of xylene absorption per unit amorphous region and the opening property. That is, although the correlation between the xylene absorption per unit amorphous region and the opening property and other qualities is not fully clear, it is considered that a low xylene absorption per unit amorphous region corresponds to a high density of the amorphous region, which results in a reduction in stickiness due to the amorphous region, whereby an excellent opening property is obtained. This consideration is based on the fact that, generally, the higher the density of a film, the lower is the stickiness thereof. The density per unit amorphous region tends to become high as the polymerization pressure becomes high, although the mechanism of this phenomenon is not clear.

As stated above, the opening property is synonymous with the blocking property. For commercial purposes, it is desirable that a polymer film have a blocking value of 300 g/10 cm² or less, preferably 100 g/10 cm² or less. The copolymer having an excellent opening property according to the present invention can satisfy the above mentioned blocking value range.

(5) Thermal property and other features

Another feature of the copolymer of the present invention, in its preferred embodiment, is that it exhibits a single melting point based on differential thermal analysis. In this regard, the copolymer of the present invention is clearly distinguishable from the low-density polyethylenes prepared by using Ziegler catalysts or chromium catalysts under a low pressure. That is, when a low-density polyethylene having a density of 0.940 or less is subjected to differential thermal analysis (DSC) under conditions such that the cooling rate of the sample is 10° C./min. and the heating rate of the sample during the measuring operation is 10° C./min., there is obtained a heat absorption curve having a plurality of sharp peaks (in most cases, 2 to 3) within a temperature range of from 100° to 130° C., which peaks correspond to melting points thereof.

The singularity of the melting point of a polymer signifies that the polymer has a single crystalline form. A polymer having a single crystalline form is considered to be more homogeneous than a polymer having a plurality of crystalline forms.

Thus, the copolymer of the present invention, in its preferred embodiment, has a highest melting point ($T_{MPE}$) higher than the melting point of high-pressure polyethylene but lower than the melting point of polyethylene prepared by using Ziegler catalysts under low pressure. More specifically, the relationship between the highest melting point ($T_{MPE}$) and the density (D) of the copolymer of the present invention is as follows.

$$700D - 536 < T_{MPE} < 50D + 77$$

The fact that a polymer has a single melting point has an important meaning particularly when the polymer is a copolymer. When a plurality of monomers are copolymerized with each other, it is difficult to produce a copolymer having a single crystalline form. This is because the polymerizabilities of the monomers are usually different from each other. The copolymer of the present invention having a single melting point contains the comonomers (α-olefin monomers) uniformly dispersed therein. Therefore, even if the copolymer of the present invention contains a comonomer unit content lower than that of the conventional copolymer prepared by using a Ziegler catalyst under a low pressure, it exhibits a density lower than that of the conventional copolymer.

The copolymer of the present invention generally has a very narrow molecular weight distribution. For example, according to a preferred embodiment of the invention, the copolymer has a Q value ($\overline{M}_W/\overline{M}_N$) of from 2.0 to 5.0, preferably, from 2.0 to 4.0, more preferably, from 2.0 to 3.5. The narrow molecular weight distribution is probably not unrelated to the singularity of the melting point.

(6) Use

The copolymer of the present invention has excellent transparency, tear resistance and impact resistance all superior to those of high-pressure polyethylene, and its transparency, impact resistance and opening property are superior to those of copolymers prepared by using Ziegler catalysts or Phillips catalysts under low pressure. Accordingly, the copolymer of the present invention is suitable for use in producing a film.

The copolymer of the present invention can be formed into a film having a high degree of transparency by both the T-die method and the inflation method.

The copolymer of the present invention may be formed into various shaped articles by blow molding, injection molding, extrusion molding, and like techniques. As one specific example of extrusion molding, the copolymer of the present invention may be extrusion coated on other films or film-like materials (metal foil, paper, fabric, etc.) to produce a multi-layered film. Also, other resins may be extrusion coated on a film made of the copolymer of the present invention.

Because the copolymer of the present invention falls within the category of thermoplastic resins, it may be blended with other thermoplastic resins conventionally used for this type of resin, such as polyethylene, polypropylene, and ethylene-vinyl acetate copolymers. The copolymer of the present invention may have admixed therein other additives such as petroleum resins, waxes, stabilizers, antistatic agents, ultraviolet light absorbers, synthetic rubbers and natural rubbers, lubricants and inorganic fillers.

2. Preparation of copolymer

The copolymer of the present invention is prepared by subjecting the required monomers to copolymerization conditions. In order to ensure that the resulting copolymer will have the above enumerated physical properties, the choice of the catalysts and polymerization conditions used is important.

(1) Catalyst used

The catalyst used is selected from those which belong to the category of so-called Ziegler-type catalysts and are composed of a combination of the following components A and B.

(1) Component A

The component A is an organometallic compound.

The organometallic compound used as a cocatalyst in the present invention may be selected from organometallic compounds of metals of Groups I to III of the periodic table which are known as cocatalysts for the Ziegler-type catalysts. Particularly, organoaluminum compounds are preferable.

The organoaluminum compounds include those which have the formula:

$$R^1{}_{3-p}AlX^1{}_p,$$

wherein: $R^1$ represents hydrogen or a hydrocarbon residue having 1 to 20 carbon atoms, preferably, 1 to 6 carbon atoms; $X^1$ represents hydrogen, halogens or an alkoxy group having 1 to 20 carbon atoms, preferably, 1 to 6 carbon atoms; and p represents a value of $0 \leq p \leq 2$, preferably, $0 < p \leq 1.5$. Examples of such an organoaluminum compound are (a) trialkyaluminums such as trimethylaluminum, triethylaluminum, triisobutylaluminum, trioctylaluminum and tridecylaluminum; (b) dialkylaluminum monohalides such as diethylaluminum monochloride and diisobutylaluminum monochloride; (c) alkylaluminum sesquihalides such as ethylaluminum sesquihalide; (d) dialkylaluminum hydrides such as diethylaluminum hydride and diisobutylaluminum hydride; and (e) alkylaluminum alkoxides such as diethylaluminum ethoxide, diethylaluminum butoxide and diethylaluminum phenoxide.

These organoaluminum compounds of items (a) through (e) may be used singly or in mixtures of two or more of these compounds. In the polymerization under high temperature and pressure according to the present invention, a dialkylaluminum monohalide or an organoaluminum compound mixture of a dialkylaluminum monohalide with an organoaluminum compound of item (a), (c), (d) or (e) is preferably used. With regard to the amount of the organoaluminum compounds used, there is no specific limitation. However, it is desirable that the organoaluminum compound is used in a quantity such that the atomic ratio of Al/Ti with respect to a solid catalyst component as described hereinafter is in the range of from 3 to 200, preferably, from 6 to 20.

(2) Component B

The component B is a contact product of a magnesium compound defined as a component (a) and a titanium compound defined as a component (b).

(a) Magnesium compound

A magnesium compound which is suitable for use in the present invention is any of magnesium compounds in the form of a solid or a liquid.

Examples of such a magnesium compound are (i) magnesium halides such as magnesium dichloride, magnesium dibromide and magnesium diiodide; (ii) halohydrocarbyloxymagnesiums such as magnesiumethoxychloride and magnesium-hydroxychloride; (iii) magnesium dialcoholates such as magnesium diethoxide and magnesium dimethoxide; (iv) magnesium oxide and magnesium carbonate, and (v) organomagnesium compounds such as diethylmagnesium and ethylmagnesium chloride. Among these, the magnesium compounds of items (i), (ii) and (v) are preferable; and magnesium dichloride is particularly preferable. It is desirable that the solid magnesium compound have a specific surface area of at least 5 m²/g for the purpose of providing a highly active catalyst.

As the magnesium compound, use may also be made of those obtained by subjecting magnesium halides, such as magnesium dichloride, to dissolution in a suitable solvent and then to re-precipitation from the solution. Such re-precipitated magnesium compounds can be prepared by dissolving a magnesium halide in the presence or absence of an organic solvent in a medium selected from alcohols ROH wherein R represents a hydrogen residue having 3 to 10 carbon atoms; ethers R—O—R' wherein R and R' represent a hydrocarbon residue having 2 to 8 carbon atoms, or R and R' form a ring system containing a 5- to 8-membered ring; phosphoric esters $PO(OR)_3$ wherein R represents a hydrocarbon residue having 2 to 10 carbon atoms; and titanic acid esters $Ti(OR)_4$ wherein R represents a hydrocarbon residue having 3 to 10 carbon atoms and by adding a halogenating agent such as $TiCl_4$ and $SiCl_4$ or a reducing agent such as an alkylsiloxane or a derivative thereof to the resultant solution thereby to cause re-precipitation.

(b) Titanium compound

A titanium compound suitable for the present invention is selected from halides, oxyhalides, alcoholate and alkoxyhalides of titanium. Examples of these compounds are as follows.

(i) Compounds of tetravalent titanium
$TiCl_4$, $TiBr_4$, $Ti(OC_2H_5)Cl_3$, $Ti(O-n-C_4H_9)_3Cl$, $Ti(O-n-C_4H_9)_4$, etc.

(ii) Compounds of trivalent titanium
$TiCl_3$, $TiBr_3$, $Ti(OC_2H_5)Cl_2$, etc.

When a tetravalent titanium compound in the form of a liquid is used in the polymerization under high temperature and pressure according to the present invention, the resulting catalyst exhibits a high catalytic activity which leads to the production of a desirable copolymer.

The above mentioned magnesium compound and titanium compound are essential components in the present invention. The component B may contain an auxiliary component, if necessary. The use of an auxiliary component may be effective for further enhancing the uniformity of the resulting copolymer. Examples of auxiliary components are electron donors such as alcohols, ethers and esters; metal halide compounds such as $SiCl_4$ and $AlCl_3$; and polysiloxanes such as alkylhydropolysiloxanes and dialkylpolysiloxanes. A suitable method of using these auxiliary components is described in concrete terms in Japanese Patent Application Laid-open Nos. 55-21435 and 55-40745.

Contact condition

The contact between the component (a) and the component (b) may be carried out under any conditions conventionally known. However, it is desirable that the contact of these components with each other be carried out at a temperature of from −50° to 200° C., in general. The contact time is usually in a range of from about 10 minutes to about 5 hours. It is preferable that the contact between the components (a) and (b) be carried out with stirring. The use of a mechanical pulverization means such as a ball mill or a vibration mill may serve to afford a more thorough contact between the components (a) and (b).

The contact between the components (a) and (b) may also be carried out in the presence of a dispersion medium. Examples of suitable dispersion mediums for the contact are hydrocarbons, halogenated hydrocarbons and dihydrocarbylpolysiloxanes. Examples of hydrocarbons are hexane, heptane, benzene, toluene and cyclohexane. Examples of halogenated hydrocarbons are n-butyl chloride, 1,2-dichloroethane, chloroform, carbon tetrachloride, o-chlorotoluene, m-chlorotoluene, p-chlorotoluene, benzyl chloride, benzylidene chloride and iodobenzene. Examples of dihydrocarbylpolysiloxanes are dialkylpolysiloxanes such as dimethylpolysiloxane and methylphenylpolysiloxane.

Quantity ratio

The quantity of each component used may be arbitrary as long as the advantages of the present invention can be attained. Generally, the following range is preferable. The mole ratio of Mg/Ti, on which the quantity ratio of the component (a) to the component (b) depends, is in the range of, ordinarily, from 0.5 to 50, preferably, from 1 to 20.

It is preferable that the catalyst obtained by the above mentioned synthetic method have a fine particle configuration and a fine particle size. This is because such a catalyst ordinarily has a tendency to provide a copolymer having excellent uniformity. Accordingly, in order to produce a copolymer having excellent uniformity, it is desirable that the particle size of the catalyst be preferably 10 microns or less, more preferably, 5 microns or less.

(3) Quantity ratio between components A and B

The quantity ratio between the components A and B is not basically limited but is preferably within the range of 3 to 200, particularly 6 to 20, in terms of the Al/Ti atomic ratio.

(4) Preparation of catalyst

The catalyst is prepared by combining the components A and B within or outside the polymerization zone. The component A alone or a combination of the components A and B is injected into the polymerization zone under a high pressure by means of a high-pressure pump. For this reason, these components should be in the form of a liquid, or fine powder or its slurry and, if they are powdery, their particle size should preferably be of the order of $10\mu$ or less, particularly of the order of 1 to $5\mu$.

(2) Polymerization of ethylene (1) Polymerization apparatus

The polymerizaton of ethylene is preferably carried out in a continuous manner. The polymerization apparatus used for the polymerization reaction may be a continuous stirred tank reactor or a continuous tubular reactor, both of which are conventionally used for the high-pressure radical polymerization of ethylene.

The polymerizaton reaction may be carried out by using a single reactor of the above mentioned type in the form of a single compartment. Alternatively, a plurality of such reactors connected to each other in series to which a condenser is optionally connected may also be used. As another alternative, a single reactor of the above mentioned type may be effectively divided into a plurality of compartments in such a manner that the polymerization reaction can be carried out in a multi-compartment mode. In the multi-compartment mode polymerization method, the composition of monomers, the concentration of the catalyst, the concentration of a molecular weight modifier, reaction conditions and the like are ordinarily controlled separately in the respective reactors or reaction compartments so that the properties of the polymers to be produced in the respective reactors or reaction compartments can be separately controlled. In the case where a plurality of reactors are connected to each other in series, in addition to a combination of two or more continuous stirred tank reactors, or two or more continuous tubular reactors, a combination of one or more continuous stirred tank reactor and one or more continuous tubular reactor may be used.

The polymer produced in one or more reactors is separated from the unreacted monomers. The resulting polymer can be treated without removing the residual catalyst in the same manner as in the case of the production of conventional high-pressure polyethylene. The unreacted monomer mixture is blended with an additional amount of the same monomer component, and the resulting blend is recycled under pressure into the reactor. The monomer component to be added has a composition such that the resulting blend will have the same composition as that of the original feed. Generally, the additional monomer component has a composition substantially equivalent to the composition of the polymer separated from the polymerization reactor.

The catalyst is, for example, dispersed in a suitable inert liquid to prepare a fine dispersion. Then, this fine dispersion is poured directly into the reactor by means of a high-pressure pump. Examples of suitable inert liquids usable in the present invention are white spirit, hydrocarbon oil, pentane, hexane, cyclohexane, heptane, toluene, higher branched saturated aliphatic hydrocarbons and mixtures thereof. In order to prevent contact of the dispersion with water and air before it is introduced into the reactor, the dispersion is preferably stored under a nitrogen seal. Furthermore, the ethylene and the other monomers should not contain substantial amounts of water and oxygen.

As stated above, the resultant polymer can be treated without removing the catalyst remaining in the polymer. This is because the catalyst used has very high activity, which makes it possible to attain a high conversion of the monomers to a desired polymer with a very small quantity of the catalyst.

(2) Polymerization condition (i) Polymerization pressure

The pressure used in the polymerization process is more than 200 kg/cm$^2$, preferably, from 500 to 4000 kg/cm$^2$, more preferably, from 700 to 3000 kg/cm$^2$.

(ii) Polymerization temperature

The polymerization temperature is at least 125° C., preferably, in the range of from 150° to 350° C., more preferably, from 200° to 320° C.

(iii) Residence time

The average residence time in the reactor is related to the time during which the catalyst used retains its catalytic activity under the reaction conditions. The half life of the catalyst used depends on the reaction conditions, particularly, temperature. As the life of the catalyst becomes longer, the residence time of the monomers in the reactor is preferably extended. The average residence time used is in the range of from 2 to 600 seconds, preferably, from 10 to 150 seconds, more preferably, from 10 to 120 seconds.

(iv) Other features and particulars

The polymerization process of the present invention comes under the category of a high-pressure polymerization process for ethylene from the viewpoints of polymerization temperature and pressure. Therefore, the present polymerization process is carried out with substantially no liquid dispersion medium except for a small amount of the liquid medium to be introduced as a dispersion medium for the catalyst or for other purposes. Accordingly, this polymerization process requires separation of only the non-reacted monomers from the resulting polymer after the polymerization reaction has been completed. Separation of any liquid medium from the resulting polymer and refining of the separated liquid medium are unnecessary.

In accordance with this polymerization process, the resulting polymer contains only a trace of the residual catalyst, so that it is unnecessary to decompose and refine the residual catalyst. The resulting polymer is separated from the unreacted monomers in a separator. In this manner, a polymer product is obtained. This product may be used directly as it is. Alternatively, the product may be subjected to various post-treatment procedures such as those which have been already used for products obtained by the high-pressure radical polymerization process.

3. Experimental examples

The methods of measurements used for evaluation of the quality of the copolymer of the present invention were as follows.

(1) MFR: ASTM D-1238
(2) Density: ASTM D-1505
(3) Haze: ASTM D-1003
(4) Bag drop impact strength:

A test bag of blown film of a thickness of 30 microns, which is filled with 2,250 grams (g) of sand per 100 mm of flat width of the bag, is freely dropped from progressively increased heights onto the floor. The maximum height (cm) at which the bag does not rupture is taken as the bag-drop impact strength (BDI).

(5) Opening property:

A loading pressure of 15 kg/cm$^2$ is applied on a test piece of a blown film (tube) of a thickness of 30 microns at a temperature of 45° C. for 24 hours. Thereafter, the force (in g/10 cm$^2$) necessary for separating the opposed walls of the film is determined. This force value represents the blocking value.

(6) Differential thermal analysis (DSC)

A Perkin-Elmer DSC type 2 differential thermal analyzer is used. 5 mg of a sample is melted by heating it to a temperature of 150° C. Then the melt is cooled at a cooling rate of 10° C./min. and crystallized. The crystallized sample is again heated from 50° to 150° C. at a heating rate of 10° C./min., and measurement is carried out. The melting points of the sample are determined from the temperatures corresponding to the respective peaks in the resulting heat absorption curve. The melting point at the highest temperature represents the highest melting point ($T_{MPE}$).

EXAMPLE 1 (and Comparative Examples 3 through 4)

Preparation of catalyst component

A reactor equipped with an agitator and an external jacket, whose inside atmosphere was replaced by nitrogen gas ($N_2$), was charged with 1 l of n-heptane which had been thoroughly degassed and refined. Then 0.67 mole of anhydrous $MgCl_2$ and 0.2 mole of $Ti(O-nC_4H_9)_4$ were introduced into the reactor. The resulting mixture was agitated at a temperature of 70° C. for 1 hour. Then, 0.53 mole of $n-C_4H_9OH$ was introduced into the reactor, and the resulting mixture was agitated for 1 hour. Thereafter, 0.13 mole of $AlCl_3$ was introduced into the reactor, and the resulting mixture was agitated for 1 hour. In addition, 0.13 mole of $TiCl_4$ and 1 mole of methylhydropolysiloxane (MHPS) having a viscosity of 21 centistokes were introduced into the reactor, and the resulting mixture was agitated at a temperature of 70° C. for 2 hours. After the reaction was completed, a solid component was obtained as a solid catalyst component without being washed with n-heptane.

Preparation of catalyst dispersion

A catalyst preparation vessel equipment with an agitator, the atmosphere within which was replaced by nitrogen gas ($N_2$), was charged with 25 l of n-hexane which had been thoroughly degassed and refined. Then 5 g of the solid catalyst component prepared as described above and 124 millimole of diethylaluminum chloride were added to the reactor, and the solid catalyst component in the resulting mixture was preactivated so as to provide an atomic ratio Al/Ti of 16. Thereafter, hexene-1, which had been thoroughly degassed and refined, was added to the reactor in an amount such as to provide a mole ratio of hexene-1/Ti of 20. The resulting mixture was agitated for 2 hours thereby to produce a fine catalyst suspension.

High-pressure polymerization of ethylene

A continuous reactor of autoclave type with agitator having an internal volume of 1.5 l was continuously charged with 12.5 kg/hr of ethylene, 27.8 kg/hr of 1-butene, 5 l/hr of hydrogen, and 1.2 l/hr of the catalyst suspension at a polymerization temperature of 240° C. and a polymerization pressure of 1,600 kg/cm², thereby to produce a copolymer.

The resulting copolymer had a density of 0.920 g/cm³, an MFR of 0.7, a 1-butene content of 3.8 mole%, a molecular weight $M_N$ of 38,000, a Q value ($M_W/M_N$) of 4.4, one peak at a temperature of 117° C. measured by DSC, a degree of crystallinity of 48.3% determined from its density, and a xylene absorption per unit amorphous region of 0.25.

The copolymer was formed into a film having a width of 30 mm and a thickness of 30 microns by means of a commercially available high-pressure polyethylene film forming machine (manufactured by Modern Machinery K.K.). The forming operation was carried out at a resin temperature of 220° C. at a rotational speed of the screw of 50 rpm.

The evaluation results of the copolymer were as shown in Table 1 appearing hereinafter together with the polymerization conditions. In addition, two types of commercially available low-density polyethylenes were formed into films according to the same procedure as that described above. The evaluation results of the polyethylenes were as shown in Table 2 (Comparative Examples 3 and 4).

The copolymer of Example 1 and the polyethylenes of Comparative Examples 3 and 4 are all ethylene/1-butene copolymers. However, the copolymer of the present invention is superior to the commercial polyethylenes with respect to transparency, opening property, and impact strength.

EXAMPLES 2 and 7 (and Comparative Examples 5 and 6)

In each of Examples 2 and 7, a copolymer of the present invention in which 1-hexene was used as a comonomer was prepared.

Commercially available copolymers shown in Table 2 as Comparative Examples 5 and 6, are those obtained by using 4-methyl-1-pentene having the same carbon atoms of 6 as a comonomer.

The copolymers of the present invention are superior in transparency and opening property of the comparative copolymers and exhibit an impact strength BDI exceeding 5 m which is remarkably superior to that of the comparative copolymers.

EXAMPLE 3

The same polymerization reactor as that described in Example 1 was operated under the conditions indicated in Table 1 and a polymerization pressure of 2,000 kg/cm².

As is apparent from Table 1, the resulting copolymer exhibited remarkably good transparency and opening property.

EXAMPLE 4

The same polymerization reactor as that described in Example 1 was operated under the conditions indicated in Table 1 and a polymerization pressure of 300 kg/cm².

The physical properties of the resulting copolymer having a high MFR were as shown in Table 1.

EXAMPLE 5

The same polymerization reactor as that described in Example 1 was operated under the conditions indicated in Table 1. In this case, 1-octene was used as the comonomer.

The physical properties of the resulting copolymer were as shown in Table 1.

EXAMPLE 6

The same polymerization reactor as that described in Example 1 was operated under the conditions indicated in Table 1. In this case, 1-butene was used as the comonomer.

The physical properties of the resulting product having a low density were as shown in Table 1.

EXAMPLE 8

The same polymerization reactor as that described in Example 1 was operated under the conditions indicated in Table 1. In this case, 4-methyl-1-pentene was used as the comonomer.

The physical properties of the resulting copolymer were as shown in Table 1.

Comparative Examples 1 and 2

Two types of commercially available high-pressure polyethylenes were evaluated. Both of these polyethylenes exhibited poor impact strength.

TABLE 1

| | Example No. | | | | | | | |
|---|---|---|---|---|---|---|---|---|
| | 1 | 2 | 3 | 4 | 5 | 6 | 7 | 8 |
| Polymerization pressure, Kg/cm$^2$ | 1600 | 1600 | 2000 | 300 | 700 | 1600 | 1600 | 1600 |
| Polymerization temperature, °C. | 240 | 240 | 205 | 240 | 240 | 240 | 240 | 240 |
| Ethylene feed, kg/hr. | 12.5 | 12.5 | 12.5 | 12.5 | 12.5 | 12.5 | 12.5 | 12.5 |
| Type of comonomer | 1-butene | 1-hexene | 1-hexene | 1-hexene | 1-octene | 1-butene | 1-hexene | 4-methyl-1-pentene |
| Comonomer feed, kg/hr. | 27.8 | 33.5 | 30 | 50 | 18.0 | 48 | 35 | 35 |
| Hydrogen feed, l/hr. | 5 | 5 | 0 | 50 | 10 | 15 | 5 | 5 |
| Catalyst feed, l/hr | 1.2 | 0.9 | 0.7 | 1.3 | 1.5 | 1.0 | 0.9 | |
| MFR, g/10 min. | 0.7 | 1.2 | 0.2 | 80 | 2.5 | 4.0 | 0.8 | 0.8 |
| D, g/cm$^3$ | 0.920 | 0.922 | 0.925 | 0.918 | 0.938 | 0.912 | 0.920 | 0.920 |
| Comonomer content, mole % | 3.8 | 2.7 | 2.3 | 3.6 | 0.8 | 5.6 | 3.3 | 3.3 |
| $M_N$ | 38000 | 32000 | 54000 | 8600 | 26000 | 24000 | 34000 | 33800 |
| $Q(M_W/M_N)$ | 4.4 | 3.2 | 3.8 | 2.8 | 2.9 | 2.7 | 2.8 | 2.9 |
| Number of DSC peak(s) | 1 | 1 | 1 | 1 | 1 | 1 | 1 | 1 |
| Temperature of DSC peak, °C. | 117 | 120 | 122 | 115 | 125 | 117 | 122 | 122 |
| Degree of crystallization (X) | 0.483 | 0.497 | 0.518 | 0.469 | 0.607 | 0.426 | 0.483 | 0.483 |
| Xylene absorption per unit amorphous region (Y) | 0.25 | 0.23 | 0.21 | 0.27 | 0.15 | 0.32 | 0.24 | 0.25 |
| 30μ blown film | | | | | | | | |
| Haze, % | 3.8 | 3.5 | 1.3 | 3.0 | 4.1 | 1.8 | 2.1 | 2.6 |
| Opening property, g/10 cm$^2$ | 90 | 40 | 0 | 130 | 0 | 250 | 60 | 180 |
| BDI, cm | 320 | 510 | 590 | 110 | 220 | 380 | 530 | 490 |

TABLE 2

| | Comparative Example No. | | | | | |
|---|---|---|---|---|---|---|
| | 1 | 2 | 3 | 4 | 5 | 6 |
| Sample of commercially available polyethylene | YUKALON NH-50 mfd. by Mitsubishi Yuka K.K. | YUKALON YF 30 mfd. by Mitsubishi Yuka K.K. | A | B | C | D |
| MFR, g/10 min. | 2.8 | 1.0 | 1.5 | 3.5 | 2.3 | 2.2 |
| D, g/cm$^3$ | 0.925 | 0.920 | 0.920 | 0.922 | 0.921 | 0.926 |
| Type of comonomer | — | — | 1-butene | 1-butene | 4-methyl-1-pentene | 4-methyl-1-pentene |
| Comonomer content, mole % | — | — | 4.2 | 3.9 | 3.3 | 2.7 |
| $M_N$ | 22000 | 18000 | 20500 | 29300 | 28800 | 32100 |
| $Q(M_W/M_N)$ | 6.5 | 9.3 | 4.2 | 3.3 | 2.8 | 2.8 |
| Number of DSC peak(s) | 1 | 1 | 2 | 2 | 3 | 3 |
| Temperature(s) of DSC peak(s), °C. | 113 | 108 | 118 121 | 119 123 | 110 119 124 | 110 122 127 |
| Degree of crystallization | 0.518 | 0.483 | 0.483 | 0.497 | 0.490 | 0.539 |
| Xylene absorption per unit amorphous region | 0.30 | 0.32 | 0.35 | 0.33 | 0.31 | 0.36 |
| 30μ blown film | | | | | | |
| Haze, % | 6.5 | 12.0 | 12.8 | 15.2 | 4.5 | 6.5 |
| Opening property, g/10cm$^2$ | 280 | 190 | 480 | 400 | 800 | 650 |
| BDI, cm | 150 | 120 | 105 | 90 | 400 | 350 |

What we claim is:

1. A copolymer of ethylene and a minor proportion of an α-olefin having 4 to 10 carbon atoms, characterized by having in combination the properties of:
   (1) a melt flow rate (MFR) of 0.1 to 100 g/10 min.;
   (2) a density of 0.91 to 0.94 g/cm$^3$; and
   (3) a xylene absorption per unit amorphous region (Y) satisfying the following formula:

$$Y < -0.80X + 0.67$$

wherein X is the degree of crystallinity of the copolymer.

2. A copolymer as claimed in claim 1, wherein the xylene absorption per unit amorphous region (Y) satisfies the formula:

$$Y \leq -0.92X + 0.70.$$

3. A copolymer as claimed in claim 1 or 2, wherein the MFR and the density are as follows:
   MFR: 0.5 to 10 g/10 min.;
   Density: 0.915 to 0.930.

4. A copolymer as claimed in claim 1, wherein the content of the α-olefin having 4 to 10 carbon atoms is in the range of from 1.0 to 5.0 mole% of the total of the ethylene and the α-olefin contents.

5. A copolymer as claimed in claim 1, wherein the α-olefin has 6 to 8 carbon atoms.

6. A copolymer as claimed in claim 1, which has a molecular weight distribution Q value ($\overline{M}_W/\overline{M}_N$) of from 2.0 to 4.0.

7. A copolymer as claimed in claim 1, which has a single melting point as determined by the differential thermal analysis.

8. A copolymer as claimed in claim 7, wherein the relationship between the highest melting point (T$_{MPE}$, degrees in Celsius) determined by the differential thermal analysis and the density (D) is represented by the following formula:

$$700D - 536 < T_{MPE} < 50D + 77.$$

9. A copolymer as claimed in claim 8, wherein the α-olefin has 6 to 8 carbon atoms.

10. A copolymer as claimed in claim 9, which has a molecular weight distribution Q value ($\overline{M}_W/\overline{M}_N$) of from 2.0 to 4.0.

* * * * *